(12) United States Patent
Pakura

(10) Patent No.: US 6,405,954 B1
(45) Date of Patent: Jun. 18, 2002

(54) CUTTERHEAD

(75) Inventor: Franz Pakura, Fahrenholz (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/537,007

(22) Filed: Mar. 28, 2000

(30) Foreign Application Priority Data

Apr. 23, 1999 (DE) .......................... 199 18 553

(51) Int. Cl.$^7$ ................................................ B02C 1/10
(52) U.S. Cl. ..................................................... 241/294
(58) Field of Search ................................. 241/242, 294, 241/291, 292.1, 293

(56) References Cited

U.S. PATENT DOCUMENTS

| | | | |
|---|---|---|---|
| 2,781,563 A | * 2/1957 | Horth | 241/242 |
| 4,011,998 A | * 3/1977 | Holdeman et al. | 241/294 |
| 4,714,204 A | 12/1987 | John et al. | |
| 5,878,970 A | 3/1999 | Leeb | |

FOREIGN PATENT DOCUMENTS

| | | | | |
|---|---|---|---|---|
| DE | 224197 | * | 7/1985 | 241/242 |
| DE | G 88 13 953 | | 1/1989 | |
| DE | 287190 | * | 2/1991 | 241/242 |
| DE | 24 50 683 | | 1/1996 | |
| RU | 1606186 | * | 11/1990 | 241/242 |

* cited by examiner

Primary Examiner—Ed Tolan

(57) ABSTRACT

A forage harvester cutterhead includes knife holders which each, in one embodiment, form a major portion of a smooth, curved impeller blade surface, which in a second embodiment form a portion of an impeller blade surface with the major portion of the impeller blade surface being defined by a replaceable sheet metal insert that is held in place by a rail located in a recess of the knife holder, and which in a third embodiment form a portion of an impeller blade surface with a major portion of the impeller blade surface being defined by a surface of an appendage of a replaceable rail located in a recess of the knife holder.

9 Claims, 3 Drawing Sheets

CUTTERHEAD

The present invention relates to a cutterhead with a body on which knife holders are mounted and to which chopper knives are fastened.

BACKGROUND OF THE INVENTION

Cutterheads are used in installations of various designs for the chopping of materials from the agricultural, forest products and municipal economies and from other areas of the economy, for example, from plastics and food products. Such cutter heads are equipped with several knives usually arranged symmetrically, whose cutting edges may either be parallel to, or inclined to, the axis of rotation of the cutterhead and thereby produce a chopping or a drawing cut. The knives are fastened to knife holders, as a rule so that they can be removed, for example, for replacement after reaching a wear limit. The knife holders are attached to the cutterhead body either in a permanent or removable fashion, and the cutterhead body is of a known design, for example, where it consists of a cylindrical drum shell, or of an open design with disks and ring-shaped fastener retainers, or as a combination of closed and open design which results in a semi-closed configuration.

U.S. Pat. No. 5,878,970, granted Mar. 9, 1999, discloses a cutterhead that is provided with knives fastened to knife holders. It is recommended that the leading surface of the knife holder, as seen in the direction of rotation, be provided with a separate angled or rounded impeller blade part, in order to reduce wear and to prevent chopped material from adhering to this surface. A rounded form of the impeller blade part with a smooth surface, free from edges or projections, has aerodynamic advantages.

The problem underlying the invention is seen as that of making available a cost effective and easily mounted cutterhead knife holder that makes possible a smooth conveying of the chopped crop.

SUMMARY OF THE INVENTION

According to the present invention there is provided a cutterhead, for example for chopping agricultural crop material, having an improved impeller blade surface associated with each knife and its holder.

A broad object of the invention is to provide a cutterhead including a plurality of knife holders which each define at least a radially outer portion of a smooth curved surface extending from an underside location of the knife adjacent its cutting edge to a mounting surface for the knife holder.

A more specific object of the invention is to provide a cutterhead, as set forth in the previous object, wherein, in accordance with a first embodiment, an impeller blade surface is defined in its entirety by a leading surface of each knife holder and a radially inner surface portion of the associated knife, with the leading surface of the holder defining a smooth curved, one-piece impeller surface that extends radially outward from a mounting surface of the knife holder and blends smoothly into the radially inner surface portion of the knife.

Yet another specific object of the invention is to provide a cutterhead, as defined in the previous objects, wherein each knife holder, according to a second embodiment, includes a central removable rail forming part of the leading surface of the holder which blends smoothly into the leading end portion of a radially inner surface of the knife blade and cooperates therewith to define the entirety of the impeller blade surface.

Still another specific object of the invention is to provide a cutterhead, as defined in the immediately preceding object, wherein the removable rail forms an intermediate portion of the impeller surface.

Another object of the invention is to provide a cutterhead provided with knife holders which each include a removable rail that includes an appendage that extends to the mounting surface for the knife holder and defines an surface which cooperates with a radially outer surface of the holder to define a smooth curved impeller surface extending between a underside location of the knife blade trailing the knife cutting edge and the mounting surface for the knife holder.

A further object of the invention is to provide a cutterhead having knife holders which each include a removable insert having a surface which cooperates with another surface of the knife holder to define a smooth impeller surface extending between a mounting surface for the knife holder and a radially inner surface of the cutting knife adjacent a cutting edge of the knife.

These and other objects will become apparent from a reading of the ensuing description together with the appended drawings.

DESCRIPTION OF THE PREFERRED EMBODIMENT

Figure 1:
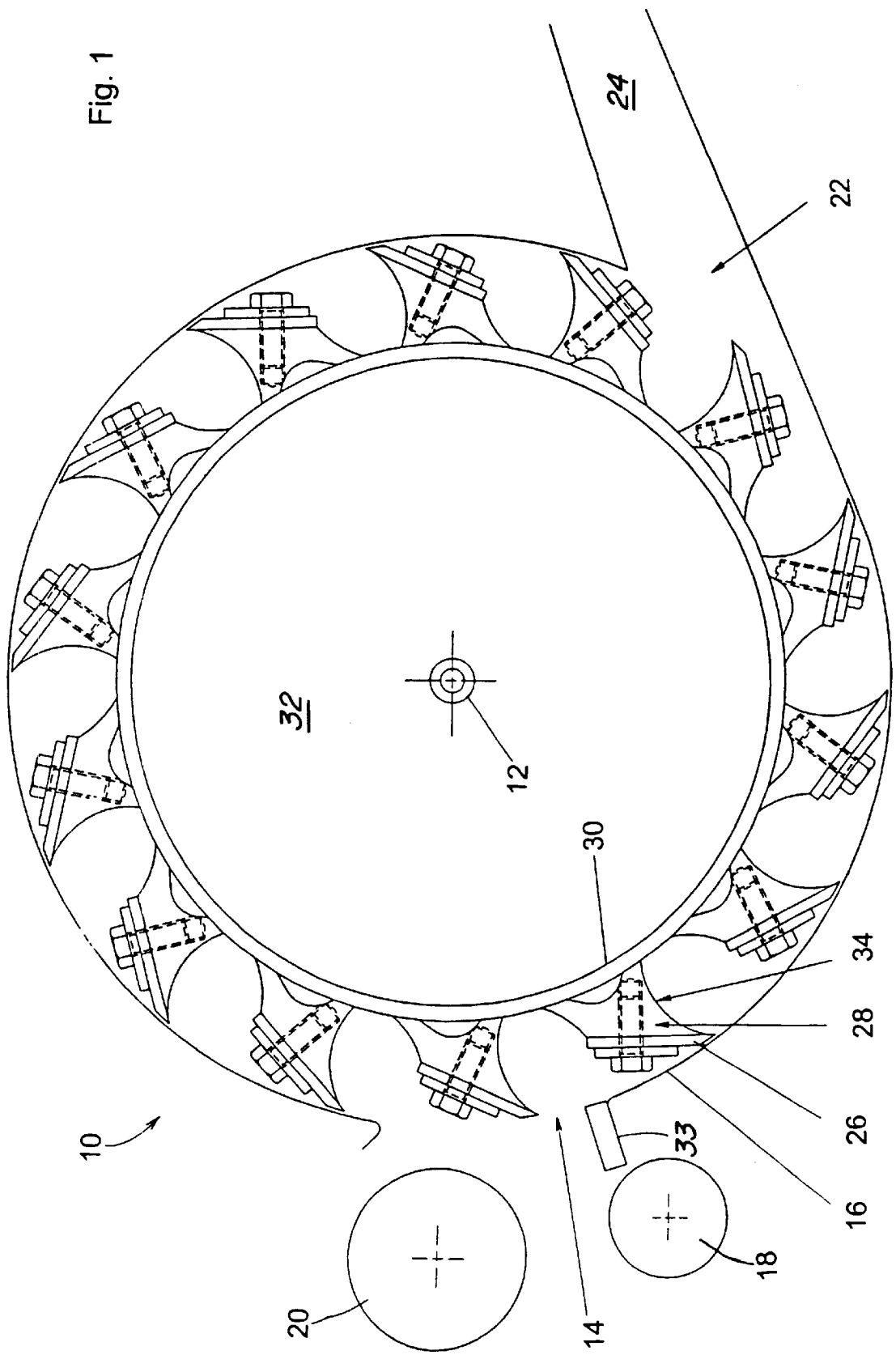
FIG. 1 is a somewhat schematic left side elevational view, with parts removed, of a chopper assembly including a cutterhead having knife holders constructed in accordance with a first embodiment of the invention.

Referring now to FIG. 1, there is shown a cutterhead 10 supported in bearings on a shaft 12, free to rotate, surrounded by a cutterhead housing 16 provided with an inlet or supply opening 14 that extends over the entire width of the cutterhead and through which the material to be chopped, in particular harvested crop, is supplied by feed rolls 18 and 20. At another point of the cutterhead housing 16, there is provided a discharge opening or outlet 22, which is followed by a duct 24.

Figure 2:
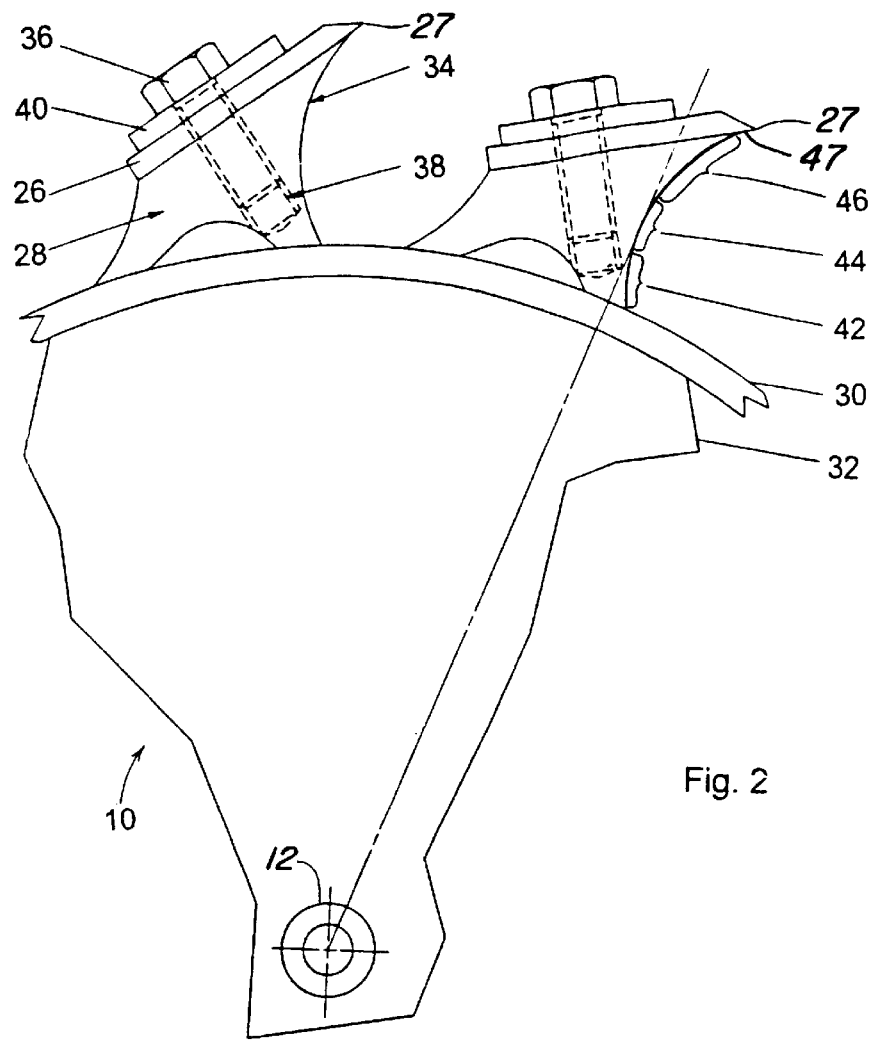
FIG. 2 is a right side elevational view of an enlargement of a section of the cutterhead shown in FIG. 1.

The cutterhead 10, as shown in FIG. 2, is equipped with chopper knives 26, whose cutting edges 27 are oriented perpendicular to the plane of the drawing and that are fastened by knife holders 28 to a cylindrical drum or shell 30 of the cutterhead 10, which is here shown connected by disks 32 to the shaft 12, however spokes could serve this purpose just as well. As viewed in FIG. 1, the cutterhead 10 rotates counterclockwise (clockwise as viewed in FIGS. 2–5) in a normal forward direction such that the chopper knives 26 work against a shear bar 33 for chopping the mass of material fed across the shear bar 33 and into the drum housing inlet 14 into lengths and subsequently to transport the chopped material by the action of the underside of the chopper knives 26 together with impeller blade surfaces 34 which are each defined in major part by a leading surfaces of a respective one of the knife holders 28, until the chopped material escapes through the cutterhead housing outlet 22. Once the chopped material exits through the outlet 22 of the housing 16, it may be conveyed through further groups of components such as funnel guide vanes and kernel processors, and supplementary accelerators before being conveyed through a discharge spout into the collection container of a transport vehicle.

During this chopping and conveying process, not only the chopped crop particles but also air, that is located in the effective area of the rotating cutterhead 10, is also conveyed along. Thus, the cutterhead 10 performs a combination of impeller blade conveying and pneumatic conveying. In particular, it is the knife holders 28 and the chopper knives attached thereto together with the elements used to attach the knives, that is radial screws 36 inserted into threaded holes 38 provided in the holders 28, as well as washers 40 or differently shaped pressure plates arranged between the heads of the screws 36 and the blades 26, that perform the chopping as well as the further conveying in a combination of impeller blade and pneumatic conveying.

A disadvantage of many cutterheads 10 with regard to the impeller blade conveying or pneumatic conveying resides in the fact that the effective surfaces, that is, the underside of the chopper knives 26 interacting with the impeller blade surfaces 34 of the knife holders 28 and the fastening elements 36 and 40 are provided with shapes that exhibit large projections, steps and/or recesses. Such structured surfaces, that are not smooth, of the elements operating as impeller blades lead to a relatively large angle of rotation of the cutterhead 10 starting with the instant of the cutting of the mass of material supplied until the ejection of the chopped particles from the effective area of the cutterhead 10. The ejection of chopped particles is delayed and occurs over a larger region of angles of rotation of the cutterhead 10.

In the extreme case, the shape of the impelling blade surface will not permit the chopped particles to be released from the conveying surface during the time that the conveying surface moves from the shear bar 33 to the housing outlet 22. These particles are then carried around in the drum housing 16 and leave it only after a complete revolution. The larger the steps, projections and recesses on the impeller blade surfaces 34 are, the larger is the proportion of chopped particles whose ejection is delayed in this way, so that they are carried around and leave the effective area of the cutterhead 10 only after one or more revolutions of the cutterhead 10.

There is a negative result as well with regard to the upper limit of the output of a chopper installation and to the power absorption of a cutterhead 10, that is required for the chopping and conveying of the chopped particles out of the cutterhead housing 16.

Such impeller blade surfaces 34, that are not smooth or are stepped, have the additional result that the velocity of the air volume flow generated by a cutterhead 10, that are provided with such non-smooth impeller blade surfaces, is lower than the velocity of an air volume flow that is generated by impeller blade surfaces 34 that have smooth, not stepped surfaces, at otherwise equal parameters of the cutterhead 10 and the housing 16.

The shape of an impeller blade surface for the conveying of chopped particles and of air as well as mixtures of air and chopped particles is found to be favorable for the conveying in regard to the amount of the pressure build-up of the air conveyed, the velocity of the volume of air flow and the direction and the amount of the ejection velocity of the chopped particles if the impeller blade surface 34 is constructed so as to have a relatively steep radially inner region 42 that blends into a middle region 44 that is essentially located along a radial line and joined to a radially outer region 46 which extends from the middle section 44 so as to blend smoothly into a fourth region 47 defined by a surface of the cutting blade 26 extending in the normal forward direction of rotation beyond the blade holder 28 and facing the shell 30. Here a continuous transition within the regions that form the impeller blade surface 34 is advantageous for the ejection of the chopped particles as well as for the pneumatic conveying.

In FIGS. 1 and 2, aside from the part defined by the underside of the chopper knife 26, the impeller blade surface 34 is formed in a one-piece unit as the leading side of the knife holders 28, as seen in the normal forward direction of rotation of the chopper drum 10.

Figure 3:
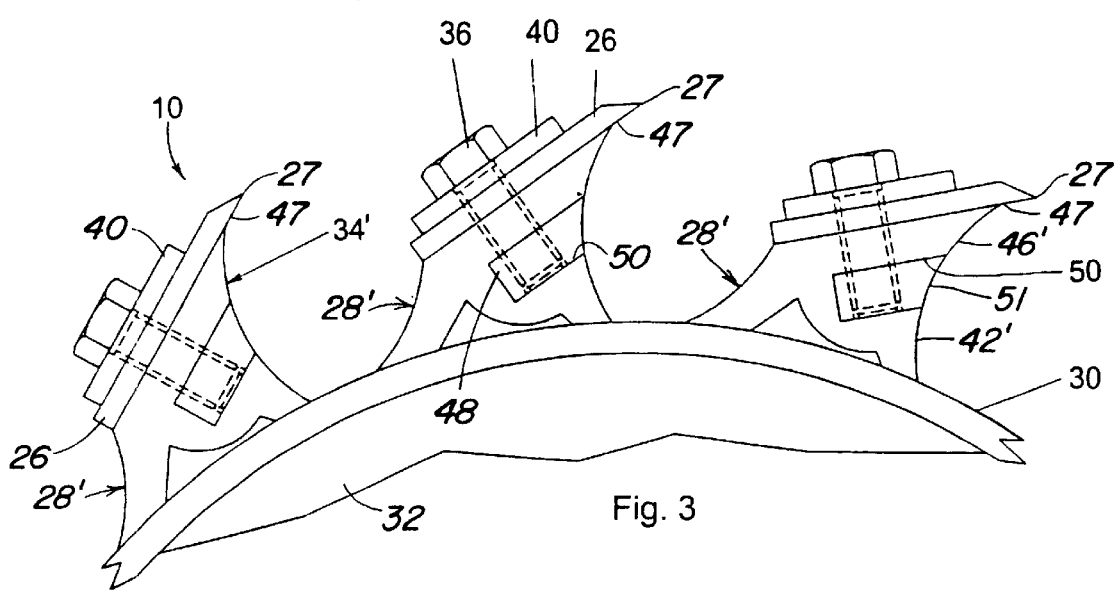
FIG. 3 is a right side elevational view of a section of a cutterhead having knife holders constructed in accordance with a second embodiment of the invention.

FIG. 3 shows a section of the chopper drum 10 according to a second embodiment of the invention. In this embodiment, a knife holder 28' is provided with a U-shaped recess 50 oriented in parallel relationship to the chopper knife 26 and opening at a central region of an impeller blade surface 34' so that a first region 42' exists radially inwardly of the recess and a third region 46' exists radially outwardly of the recess. A rail 48 is located in the recess 50 and is provided with a plurality of threaded bores spaced lengthwise of the drum 10 and into which respective ones of the blade mounting screws 36 are received to hold the rail 48 in place. The removable rail 48 has a curved leading surface which forms a central second region 51 of the impeller blade surface 34' from which the first region 42' of the surface 34' extends to the shell 30 and from which third region 46' of the surface 34' extends to the surface 47 of the chopper blade 26 that extends in the forward direction of rotation beyond the knife holder 28' and faces the shell 30 and forms a fourth region of the impeller blade surface 34'. The impeller surface 34', as viewed from the end of the cutterhead 10 in the various figures, is shaped as a whole as a circular or parabolic segment.

If the chopper knives 26 are mounted on the knife holders 28 or 28' of a cutterhead 10, as shown in FIGS. 1 through 3, then with the geometric parameters of the chopper knives 26, knife holders 28 or 28' and the further elements for the fastening of the chopper knives 26, the conveying characteristics of the chopper drum 10 are established and remain constant. This design of the impeller blade surface 34 or 34', which results in a high build up of pressure of the air conveyed by the drum 10 and consequently in a high velocity of the air flow volume, is advantageous for the conveying of chopped crop particles that have a lower specific mass such as, for example, chopped particles of wilted grass, damp hay, or hay and straw. However, in the case where silo corn is being harvested and a kernel processor is used downstream of the cutterhead 10, a lower velocity of the air flow volume generated by the chopper drum is adequate. Since the requirements of the conveying characteristics of the cutterhead 10 depend upon the type of crop being harvested and/or on whether or not other crop transporting elements are being used downstream of the chopper drum 10, a constant conveying behavior of the chopper drum 10 may be a disadvantage.

Figure 4:
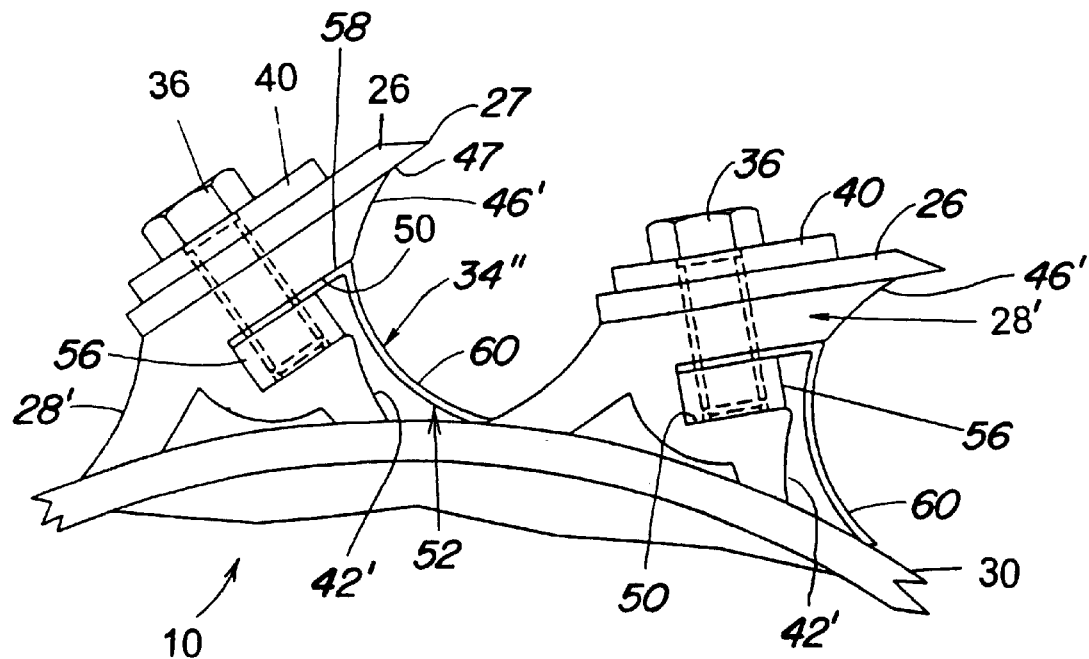
FIG. 4 is a right side elevational view of a section of a cutterhead having knife holders constructed in accordance with a third embodiment of the invention.
Figure 5:
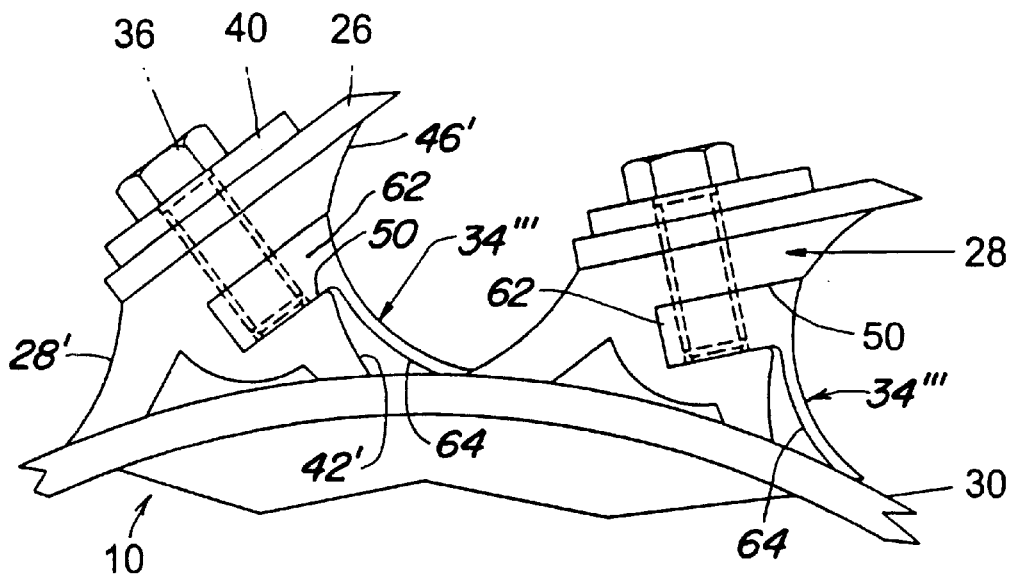
FIG. 5 is a right side elevational view like that of FIG. 4 but showing knife holders constructed in accordance with a fourth embodiment of the invention.

The further embodiments of the invention respectively shown in FIGS. 4 and 5 are directed towards chopper knife holder designs having replaceable elements forming part of the impeller blade surface and which maybe exchanged for other elements having other shapes so that the air and crop conveying characteristics of the cutterhead drum 10 may be modified so as to match the particular crop and/or downstream conveying elements.

Specifically, with reference to FIGS. 4 and 5, there is shown the cutterhead 10 equipped with chopper knife holders 28' like those of the embodiment shown in FIG. 3. Thus, the holders 28' each include a U-shaped recess 50 which is oriented in parallel relationship to the chopper knife 26 and opens in a forward surface of the holder between the radially inward surface region 42' and the radially outward surface region 46'. A rail 56, which is rectangular in cross section, is received in the recess 50 and contains threaded holes that are spaced along the length of the drum 10 and aligned with, and receive, the knife mounting screws 36, and are thus held in place by the screws 36. With reference only to FIG. 4, it can be seen that also located in each recess 50, so as to be sandwiched between the rail 56 and the radially outer surface of the recess 50, is a planar rectangular section 58 of a sheet metal component 52, the planar section 58 containing holes aligned with those in the rail 56 so that the screws 36 extend through them. Each sheet metal component 52 further includes a curved section 60 that extends in, and has its curvature facing in, the direction of rotation. The curved section 60 also extends radially inwardly from a leading end of a radially outer surface of the recess 50. The curved section 60 of the sheet metal component 52 forms a smooth continuation of the radially outer surface region 46' while extending forwardly of the radially inwardly surface region 42'. The curved section 60 terminates at the shell 30 at the base of the adjacent knife holder 28' which is particularly significant if the holders are mounted to spokes or spaced discs since the curved section 60 then cooperates with the regions 46' and 47 to form an impeller blade surface 34" which substantially prevents chopped crop material from entering the middle of the cutterhead 10. The impeller blade surface 34' is an approximate circular segment or parabolic shape with that formed by the curved section 60 of the sheet metal component 52 forming a far shallower angle with the shell 30 than does the surface segment 42'. It will be appreciated that it is possible to replace the sheet metal component 52 with another that will result in a considerable change in the cross section of the impeller blade surface 34". This makes it possible to more closely match the air and crop material conveying characteristics of the chopper blade to that required for any given crop and/or conveying components located downstream from the cutterhead 10.

Referring now to FIG. 5, there is shown a fourth embodiment of the invention which differs from the third embodiment only in that, instead of there being a separate sheet metal component, a specially shaped rail 64 is employed which includes a main body which fills the recess 50 and has a leading end joined to a curved appendage or extension 64 that extends radially inwardly to the shell 30. The appendage 64 forms a smooth continuation of the radially outer surface region 46' and cooperates with it and the radially inner surface region 47 of the knife 26 to form an impelling blade surface 34", with that part of the surface 34" that is defined by the appendage 64 being spaced in the direction of rotation from the radially inner surface region 42' of the blade holder 28'. Like the sheet metal component 52 described above, the rail 62 may be replaced with another having an appendage shaped differently than the appendage 66 so as to change the conveying characteristic of the cutterhead 10 to better match the crop and/or downstream conveying components.

In FIGS. 1 through 3, the impeller blade surface 34, particularly in the radially inward first region 42, is relatively steep (almost radial in direction), while in FIGS. 4 and 5, the first region, as respectively defined either by the curved section 60 of the sheet metal component 52 or the appendage 64 of the rail 62, is leaning quite steeply relatively to the direction of rotation of the cutterhead 10. The shapes of the impeller blade surfaces 34" and 34'", respectively, shown in FIGS. 4 and 5 make possible a good transport of material and a lower flow velocity of the air, hence, it is particularly appropriate for corn that is to be processed by kernel processing rolls downstream from the chopper drum 10. On the other hand, the impeller blade surface shape of FIGS. 1 through 3 generates a higher velocity of the air in the chopped material and ejects the chopped material out of the cutterhead 10.

What is claimed is:

1. A cutterhead, comprising: a body mounted for rotation in a normal forward direction about a horizontal axis; a plurality of knife holders mounted on said body; a plurality of knives respectively mounted to said plurality of knife holders and each having a leading cutting edge; each knife holder extending parallel to said horizontal axis and including a surface, which, as considered in said normal forward direction of rotation of said cutterhead, defines at least a portion of a smooth, curved impeller blade surface that faces in said forward direction of rotation and extends from the vicinity of said cutting edge, of the knife mounted to the knife holder, to said body.

2. The cutterhead, as set forth in claim 1, wherein each impeller blade surface associated with a given knife holder includes a leading underside surface of the knife mounted to said knife holder, with an entire remaining portion of the impeller blade surface being defined by said knife holder.

3. The cutterhead, as set forth in claim 2, wherein said remaining portion of each impeller blade surface includes a central section between radially inner and outer sections, with said central section being approximately radial and with said inner section making a relatively steep angle with a cylindrical path traced by a radially outer perimeter of said body, and with said outer section making a relatively shallow angle with said underside surface of the associated knife.

4. The cutterhead, as set forth in claim 2, wherein said knife holder is constructed entirely of one piece.

5. The cutterhead, as set forth in claim 3, wherein said knife holder is constructed of two pieces, with one of the two pieces being in the form of a removable rail having a surface forming said central section of said impeller blade surface.

6. The cutterhead, as set forth in claim 1 wherein each impeller blade surface associated with a given knife holder includes a leading underside surface portion of the associated knife and a radially outer surface of said knife holder; said knife holder including a recess opening in said direction of rotation; an insert being mounted to said blade holder at said recess and including an insert surface facing in said direction of rotation and forming a curved smooth continuation of said radially outer section of said impeller blade and cooperating therewith to define an entire remaining portion of said impeller blade surface.

7. The cutterhead, as set forth in claim 6, wherein said plurality of knife holders includes knife holders located in adjacent leading relationship to other knife holders; and each insert surface extending from said other knife holders to the trailing side of the adjacent leading knife holder.

8. The cutterhead defined in claim 6 wherein said insert is in the form of a sheet metal piece having a first leg located in said recess and a second leg defining said remaining portion of said impeller blade surface; a rail being located in said recess so as to sandwich said first leg against a wall of said recess; and a plurality of knife mounting bolts extending through an associated knife and insert leg and being threaded into said rail so as to capture said insert leg in said recess, whereby sheet metal pieces having different shaped second legs may be interchanged with one another so as to change the impelling characteristics of the impeller blade surface.

9. The cutterhead defined in claim 6 wherein said insert is in the form of a rail occupying said recess; and said rail including a leading appendage defining said insert surface forming the remaining portion of said impeller blade surface, whereby said insert may be interchanged with other inserts having appendages that define impelling blade surfaces of different curvature so as to change the impelling characteristics of the impeller blade surface.

* * * * *